US012600893B2

(12) United States Patent
Tang et al.

(10) Patent No.: US 12,600,893 B2
(45) Date of Patent: Apr. 14, 2026

(54) PHOTOTHERMAL ENERGY CONVERSION AND THERMAL ENERGY STORAGE FORM-STABLE PHASE CHANGE COMPOSITE MATERIAL AND PREPARATION METHOD THEREOF

(71) Applicant: DALIAN UNIVERSITY OF TECHNOLOGY, Liaoning (CN)

(72) Inventors: Bingtao Tang, Liaoning (CN); Xiaoqiao Fan, Liaoning (CN); Lu Liu, Liaoning (CN); Yuang Zhang, Liaoning (CN); Shufen Zhang, Liaoning (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 1114 days.

(21) Appl. No.: 17/312,310

(22) PCT Filed: Jun. 18, 2019

(86) PCT No.: PCT/CN2019/091624
§ 371 (c)(1),
(2) Date: Jul. 29, 2021

(87) PCT Pub. No.: WO2020/119055
PCT Pub. Date: Jun. 18, 2020

(65) Prior Publication Data
US 2022/0025238 A1     Jan. 27, 2022

(30) Foreign Application Priority Data
Dec. 9, 2018     (CN) .......................... 201811499609.2

(51) Int. Cl.
_C09K 5/06_     (2006.01)

(52) U.S. Cl.
CPC .......... _C09K 5/063_ (2013.01); _F28F 2255/06_ (2013.01); _F28F 2255/20_ (2013.01)

(58) Field of Classification Search
CPC .... C09K 5/063; F28F 2255/06; F28F 2255/20
See application file for complete search history.

(56) References Cited

FOREIGN PATENT DOCUMENTS

CN     101948674 A     1/2011
CN     104910868 A     9/2015
(Continued)

OTHER PUBLICATIONS

CN106047305 translation. (Year: 2016).*
(Continued)

_Primary Examiner_ — Angela C Brown-Pettigrew
_Assistant Examiner_ — Jiajia Janie Cai
(74) _Attorney, Agent, or Firm_ — NKL Law; Allen Xue

(57) ABSTRACT

A composite material is applicable for photothermal energy conversion and thermal energy storage form-stable phase change. The composite material includes a supporting material and an organic phase-change material. The mass ratio of the supporting material to the organic phase change material is 3:7 to 1:9. The supporting material is lamellar, and the organic phase change material is evenly filled between supporting material layers to form a layered stacked structure. The supporting material is a nanosheet of $Ti_2C$, $Ti_3C_2$, $Ti_3CN$, $V_2C$, $Nb_2C$, $TiNBC$, $Nb_4C_3$, $TA_4C_3$, $(Ti_{0.5}Nb_{0.5})_2C$, or $(V_{0.5}Cr_{0.5})_3C_2$. The organic phase-change material is paraffin, fatty acid, fatty acid ester or alcohol compound.

15 Claims, 6 Drawing Sheets

(56) References Cited

FOREIGN PATENT DOCUMENTS

| CN | 106047305 | A | * | 10/2016 | ............. C09K 5/063 |
| CN | 107645065 | A | * | 1/2018 | |
| CN | 107660114 | A | * | 2/2018 | ........... H05K 9/0081 |
| CN | 108245682 | A | | 7/2018 | |
| CN | 108251054 | A | * | 7/2018 | .............. C09K 3/00 |
| CN | 108565471 | A | | 9/2018 | |
| CN | 109852349 | A | | 6/2019 | |
| JP | H05214672 | A | | 8/1993 | |

OTHER PUBLICATIONS

"MXene Ti3C2: An Effective 2D Light-to-Heat Conversion Material", Li et al., ACS Nano, 11, 3752-3759, 2017. (Year: 2017).*
CN106047305A translation. (Year: 2016).*
"MXene Ti3C2: An Effective 2D Light-to-Heat Conversion Material", Li et al., ACS Nano, 11:3752-3759, Mar. 24, 2017. (Year: 2017).*
"Theranostic 2D Tantalum Carbide (MXene)", Shi et al., Adv. Mater. 30, 1703284, 2018. (Year: 2018).*
"A Two-Dimensional Biodegradable Niobium Carbide (MXene) for Photothermal Tumor Eradication in NIR-I and NIR-II Biowindows", Chen et al., J. Am. Chem. Soc., 139, 16235-16247, Oct. 24, 2017. (Year: 2017).*
"A Two-Dimensional Biodegradable Niobium Carbide (MXene) for Photothermal Tumor Eradication in NIR-I and NIR-II Biowindows", Chen et al., J. Am. Chem. Soc., 139, 16235-16247, Oct. 24, 2017 (Supporting Information) (Year: 2017).*
CN 107660114 A translation. (Year: 2018).*
CN 107645065 A translation. (Year: 2018).*
CN 108251054 A translation. (Year: 2018).*
Fan, Xiaoqiao. et al.; MXene Ti3C2Tx for Phase Change Composite with Superior Photothermal Storage Capability; .Journal of Materials Chemistry A, vol. 23, No. 7, May 16, 2019, ISSN: 2050-7488, pp. 14319-14237.

* cited by examiner

|  | PEG6000 | Time (s) | 'EG/Ti₃C₂Tₓ |
|---|---|---|---|
| 35 °C | | | |
| 65 °C | | | |
| 95 °C | | | |

PHOTOTHERMAL ENERGY CONVERSION AND THERMAL ENERGY STORAGE FORM-STABLE PHASE CHANGE COMPOSITE MATERIAL AND PREPARATION METHOD THEREOF

TECHNICAL FIELD

The present disclosure belongs to the field of functional composites, in particular to a photothermal energy conversion and thermal energy storage form-stable phase change composite material and preparation method thereof.

BACKGROUND

Organic solid-liquid phase change material (OSLPCM), as a latent heat storage material, can be used to realize the storage and release of a large amount of energy within a very small range of temperature change. OSLPCM can store thermal energy from the surrounding environment, such as the waste heat generated by vehicles, electronic products, etc. In particular, OSLPCM can convert sunlight into thermal energy and store it. However, the organic solid-liquid phase change material also has some problems, such as low thermal conductivity, easy leakage during use, lack of energy conversion ability, etc.

MXenes is a two-dimensional transition metal carbon/nitrogen compound, having surface hydrophilicity, metallic conductivity and good electrochemical property, which is expected to be used in many fields such as energy storage, catalysis, adsorption, hydrogen storage, sensors and new polymer reinforced composites. Due to the localized surface plasmon resonance (LSPR) effect, the MXenes nanosheets have strong absorption in the visible region and near infrared region. Therefore, MXenes nanosheets can be applied in the field of energy storage.

SUMMARY OF THE INVENTION

The present disclosure discloses a photothermal energy conversion and thermal energy storage phase change composite material, which takes the MXenes nanosheet as the photothermal conversion functional material and the phase change material as the energy storage material, by combining the two materials to obtain a new type of phase change composite material having high phase change enthalpy, good shape stability, good thermal stability, having a broad prospect in the field of thermal energy storage and utilization.

In the photothermal energy conversion and thermal energy storage phase change composite material of the present disclosure, the phase change materials are evenly dispersed between the layers of the MXenes nanosheets to obtain the form-stable phase change composite material that can realize the photothermal energy conversion and thermal storage. The form-stable phase change composite material has high phase change enthalpy and high thermal stability. At 95° C., the form-stable phase change composite material is still solid, however at 65° C., the phase change material has partially melted, which shows that the form-stable phase change composite material has excellent shape stability.

A photothermal energy conversion and thermal energy storage form-stable phase change composite material, including a supporting material and an organic phase change material, wherein a mass ratio of the supporting material and the organic phase change material is 3:7 to 1:9.

The supporting material is lamellar, and the organic phase change material is evenly filled between the layers of the supporting material to form a layered stacked structure.

The supporting material is a nanosheet of $Ti_2C$, $Ti_3C_2$, $Ti_3CN$, $V_2C$, $Nb_2C$, $TiNbC$, $Nb_4C_3$, $Ta_4C_3$, $(Ti_{0.5}Nb_{0.5})_2C$, or $(V_{0.5}Cr_{0.5})_3C_2$; wherein the nanosheet is single layer or multilayer having a size of 1.5 to 2.2 μm.

The organic phase change material is paraffin, fatty acid, ester of fatty acid, or alcohol compound.

The stacked structure of the present disclosure refers to a shape similar to the accordion bellows.

The nanosheet in the present disclosure is a single layer or multilayer, because the number of layers of the nanosheet cannot be accurately controlled by stripping generally, and the thickness of the obtained nanosheet varies from single layer to several layers. The size 0.5 to 2.2 μm of the nanosheet refers to the size of the cross section of the nanosheet. The shape of the cross section can be of various shapes, when the shape of the cross section is circular, 0.5 to 2.2 μm refers to the diameter size of the nanosheet.

The organic phase change material of the present disclosure refers to the organic solid-liquid phase change material.

Preferably, the paraffin has a melting point of 20 to 60° C.

Preferably, the fatty acid is dodecanoic acid, myristic acid, pentadecanoic acid, palmitic acid, or stearic acid.

Preferably, the alcohol compound is lauryl alcohol, tetradecyl alcohol, hexadecanol, octadecanol, or polyethylene glycol having a molecular weight of 2000 to 20000.

Another aspect of the present disclosure is to disclose a method for preparing the photothermal energy conversion and thermal storage form-stable phase change composite material, including the following steps:

S1. mixing a precursor with 40 vol. % hydrofluoric acid at a ratio of 1 g:8 mL to 1 g:10 mL and placing for 1 to 3 days, to obtain stacked Mxenes, wherein the precursor is $Ti_2AlC$, $Ti_3AlC_2$, $Ti_3AlCN$, $V_2AlC$, $Nb_2AlC$, $TiNbAlC$, $Nb_4AlC_3$, $Ta_4AlC_3$, $(Ti_{0.5}Nb_{0.5})_2AlC$, or $(V_{0.5}Cr_{0.5})_3AlC_2$;

S2. centrifugally washing the obtained stacked MXenes with deionized water to pH 7 and drying, mixing MXenes with dimethyl sulfoxide at a ratio of 1 g:10 mL to 1 g:14 mL, magnetic stirring the solution at room temperature for 18 hours, and obtaining a precipitate by centrifugal separation; the precipitate is MXenes with dimethyl sulfoxide intercalation, that is, multilayer MXenes with DMSO intercalation;

S3. mixing the multilayer MXenes (with DMSO intercalation) obtained in step S2 with deionized water at a ratio of 1 g:200 mL to 1 g:300 mL, ultrasonic stripping the solution for 5 hours (to transform the multilayer MXenes nanosheets to fewer layers or single layer MXenes nanosheets), obtaining the MXenes nanosheets after solid-liquid separation and ultrasonic cleaning, and dissolving the MXenes nanosheets in a solvent to obtain a MXenes nanosheet dispersion liquid with a mass fraction of 1% to 5%;

S4. adding an organic phase change material to the MXenes nanosheet dispersion liquid, wherein the mass ratio of the organic phase change material to the MXenes nanosheet is 9:1 to 7:3, obtaining the photothermal energy conversion and thermal energy storage form-stable phase change composite material after ultrasonic mixing and drying;

Wherein the organic phase change material is paraffin, fatty acid, ester of fatty acid, or alcohol compound.

Further, the solvent is deionized water or ethanol.

Preferably, the operations of the step S3 are as follows: after ultrasonic stripping, obtaining the precipitate of the target MXenes nanosheets by solid-liquid separation; ultrasonically cleaning the precipitates with deionized water for 3 times, removing the supernatant by solid-liquid separation, and then evenly dispersing the precipitates of the target MXenes nanosheets in water or ethanol to obtain MXenes nanosheet dispersion liquid.

Preferably, in step S4, after ultrasonic mixing, adjusting the pH of the solution to 8, and drying in vacuum at 50° C.

Preferably, the paraffin has a melting point of 20 to 60° C.; the fatty acid is dodecanoic acid, myristic acid, pentadecanoic acid, palmitic acid, or stearic acid; and the alcohol compound is lauryl alcohol, tetradecyl alcohol, hexadecanol, octadecanol, or polyethylene glycol having a molecular weight of 2000 to 20000.

The polyethylene glycol in the present disclosure is also abbreviated as PEG.

In the present disclosure, the organic solid-liquid phase change material is filled between the layers of MXenes to obtain composite form-stable phase change energy storage material. The phase change enthalpy and phase change temperature of the form-stable phase change energy storage composite material (FSPCM) are obviously lower than those of PEG, mainly because the crystal of PEG in FSPCM is restricted and disturbed by the compounds acting as skeleton support. The phase change enthalpy of the obtained phase change composite material reaches about 150 J/g, which indicates that the obtained form-stable composite phase change material has good performance of phase change thermal storage. The obtained nanosheet composite phase change energy storage material has similar crystallization characteristic with PEG.

Under the sunlight, the temperature of the composite phase change energy storage material increases rapidly and the curve has an inflection point near 59° C.; the phase change components in the surface material occur phase change, and the optical energy is stored as latent heat. After stopping the sunlight, the temperature of the composite phase change energy storage material goes down rapidly; when the temperature falls to about 49° C. and no longer falls, and slightly rises, and maintains at about 49° C. for a period of time, which indicates that the material has the characteristics of photothermal conversion and phase change thermal storage.

FSPCM remains solid at 95° C. while PEG has partially melted at 65° C., which indicates that the composite phase change energy storage material has excellent form-stable phase change characteristic.

Beneficial effects of the present disclosure: The present disclosure relates to a photothermal energy conversion and thermal energy storage phase change composite material, which uses the MXenes nanosheet as the photothermal conversion functional material and the phase change material as the energy storage material, by combining the two materials to obtain a new type phase change composite material having high phase change enthalpy (up to about 150 J/g), excellent shape stability and thermal stability.

DETAILED DESCRIPTION OF DRAWINGS

DETAILED DESCRIPTION OF PREFERRED EMBODIMENTS

The following unrestricted embodiments may give a more complete understanding of the present disclosure to the ordinary skilled in the art, but do not in any way limit the disclosure.

The test methods in the following embodiments are all conventional methods unless specified; and the reagents and materials are commercially available unless specified.

Embodiment 1

A photothermal energy conversion and thermal energy storage form-stable phase change composite material was prepared by the following steps:

S1. 1 g of Ti$_3$AlC$_2$ was dissolved in 8 mL of water to obtain the precursor solution, and 1 g of hydrofluoric acid was dissolved in 10 mL of water to obtain the hydrofluoric acid solution. The precursor solution was mixed with the hydrofluoric acid solution and placed for 3 days to obtain the stacked Ti$_3$C$_2$.

S2. The stacked Ti$_3$C$_2$ after treatment was centrifugally washed with deionized water until pH 7, dried and mixed with dimethyl sulfoxide (DMSO) at a ratio of 1 g:12 mL, the mixture was stirred by magnetic force at room temperature for 18 hours, and then the supernatant was poured out by centrifugation to obtain the multilayer Ti$_3$C$_2$ precipitate with DMSO intercalation.

S3. The multilayer Ti$_3$C$_2$ precipitate with DMSO intercalation was mixed with deionized water at a ratio of 1 g:300 mL, and was ultrasonic stripped for 5 hours; the supernatant was poured out by centrifugation, and the precipitate was ultrasonically cleaned with deionized water for 3 times to obtain the Ti$_3$C$_2$ nanosheets. Taking deionized water as the solvent, the Ti$_3$C$_2$ nanosheets were evenly dispersed in deionized water to obtain the Ti$_3$C$_2$ nanosheet dispersion liquid, and the mass fraction of the Ti$_3$C$_2$ nanosheet in the Ti$_3$C$_2$ nanosheet dispersion liquid was 1.4%.

S4. The PEG 6000 was added to the Ti$_3$C$_2$ nanosheet dispersion liquid, and the mass ratio of PEG to the Ti$_3$C$_2$ nanosheet was 4:1. The mix solution was treated by ultrasonic for 30 min and adjusted pH to 8, and was dried in vacuum at 50° C. to obtain the Ti$_3$C$_2$ nanosheet phase change composite material.

Figure 1A:
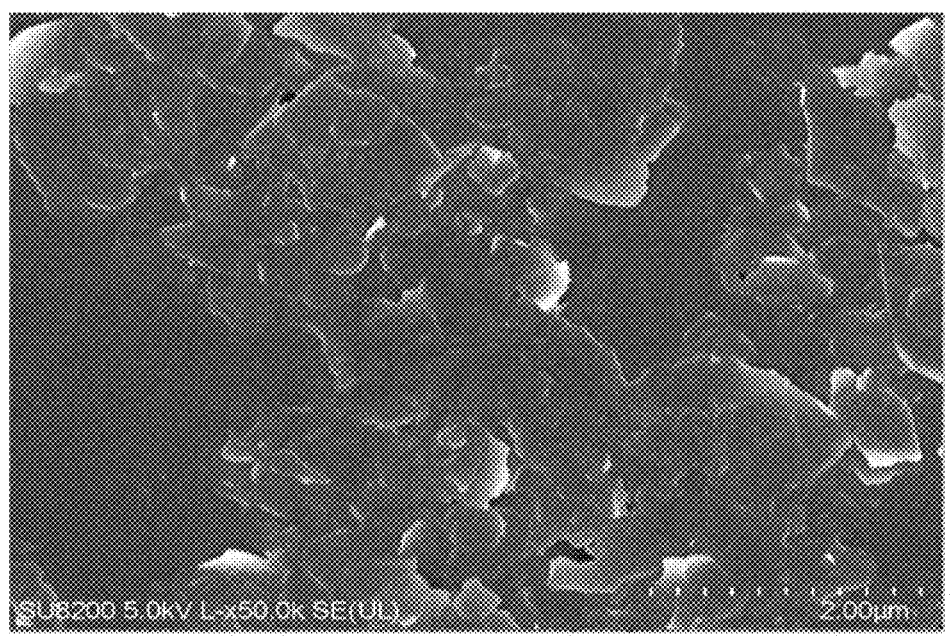
FIGS. 1A and 1B are the scanning electron microscope (SEM) and transmission electron microscope (TEM) images of the MXenes in Embodiment 1.
Figure 1B:
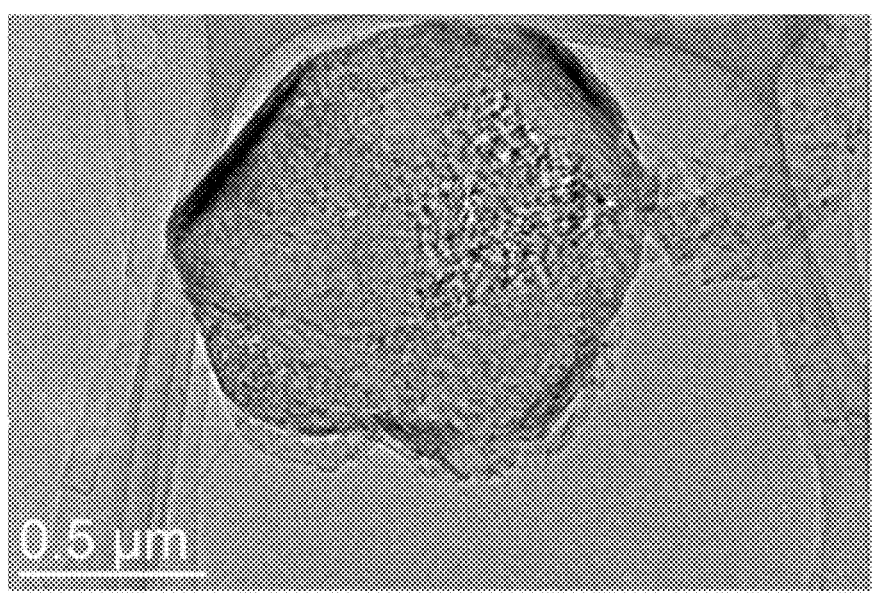
Figure 2A:
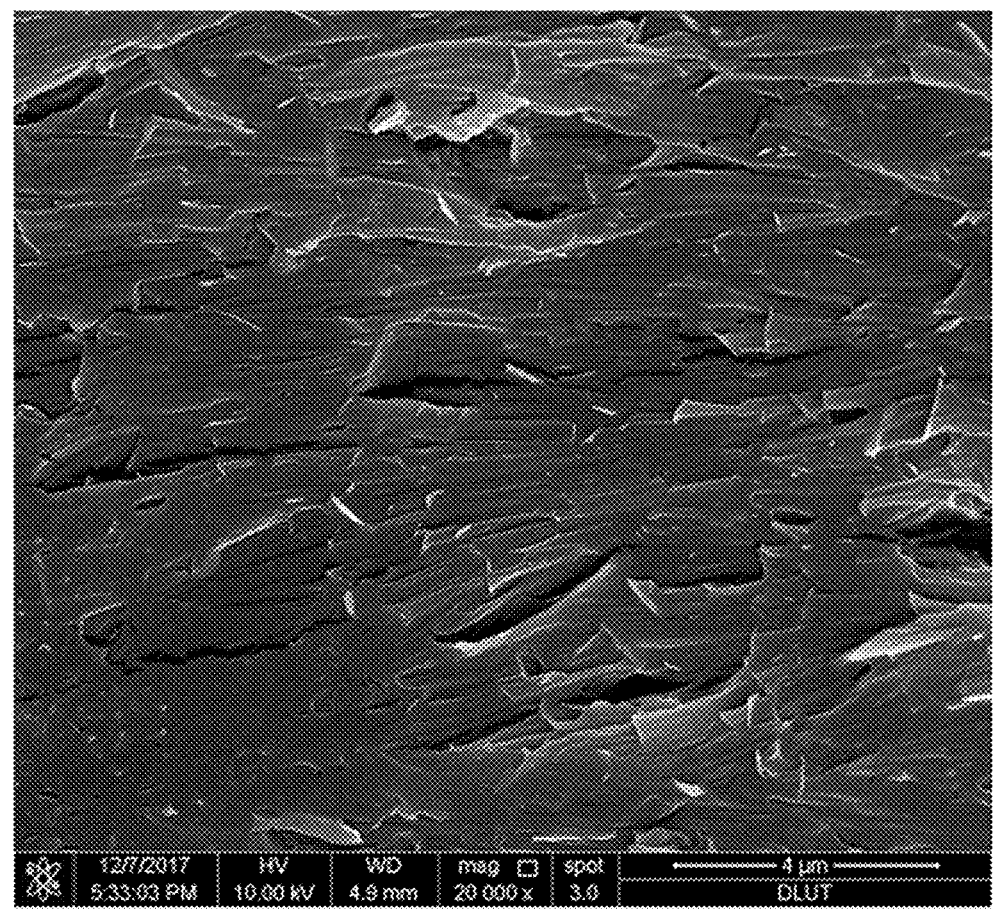
FIGS. 2A and 2B are the SEM images of the FSPCM in Embodiment 1.
Figure 2B:
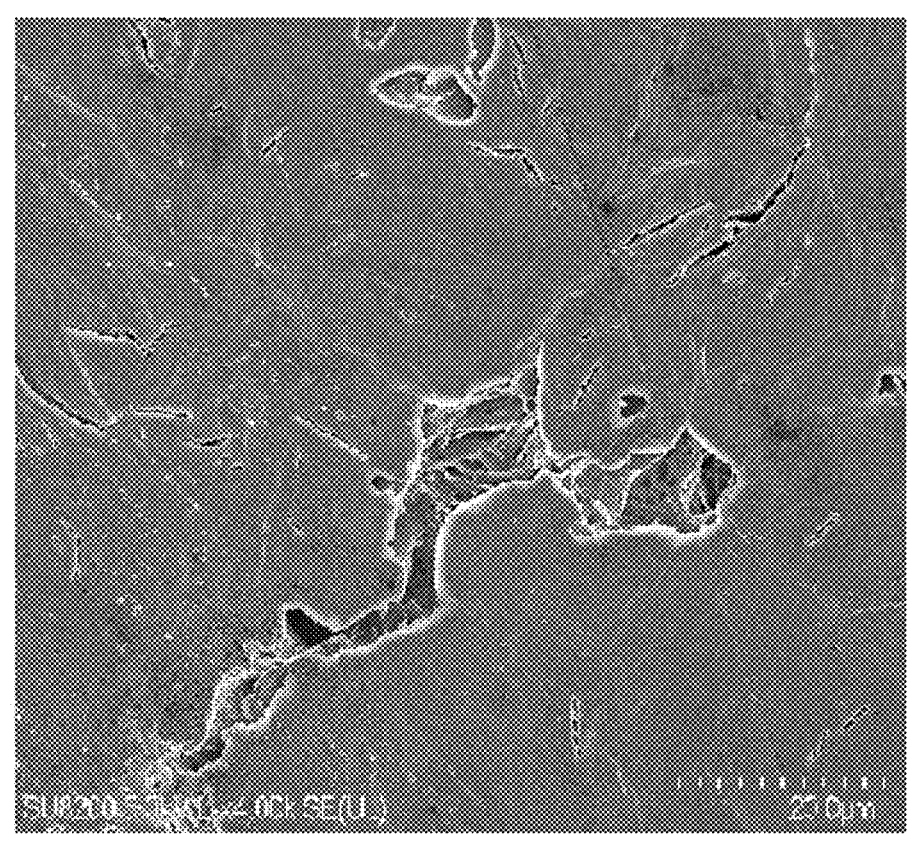
Figure 3:
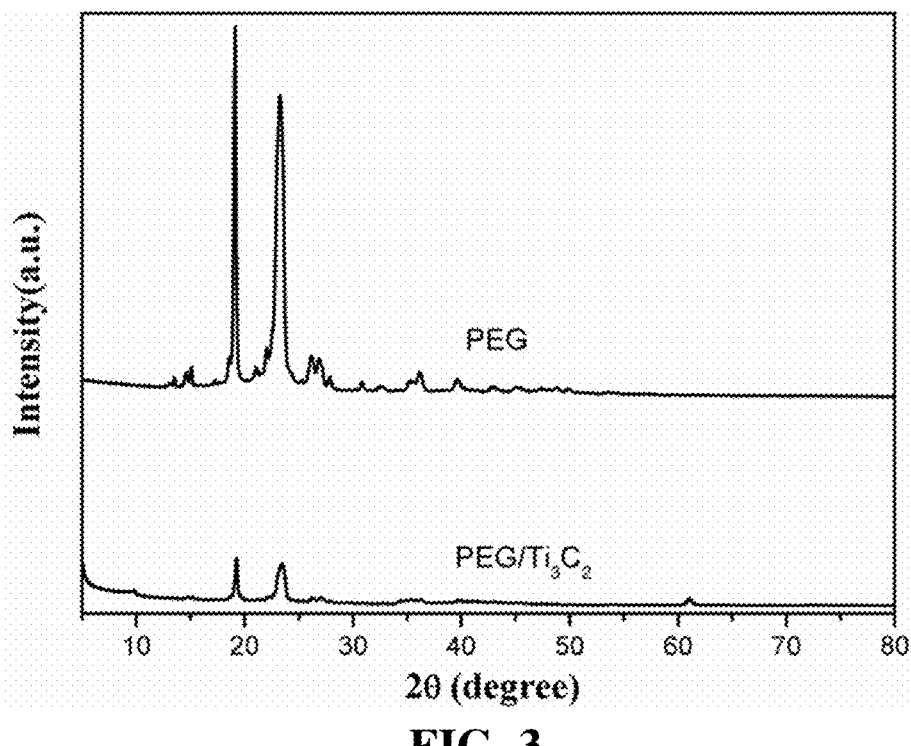
FIG. 3 is an X-ray diffraction (XRD) image of the PEG and the composite form-stable phase change energy storage material in Embodiment 1.
Figure 4:
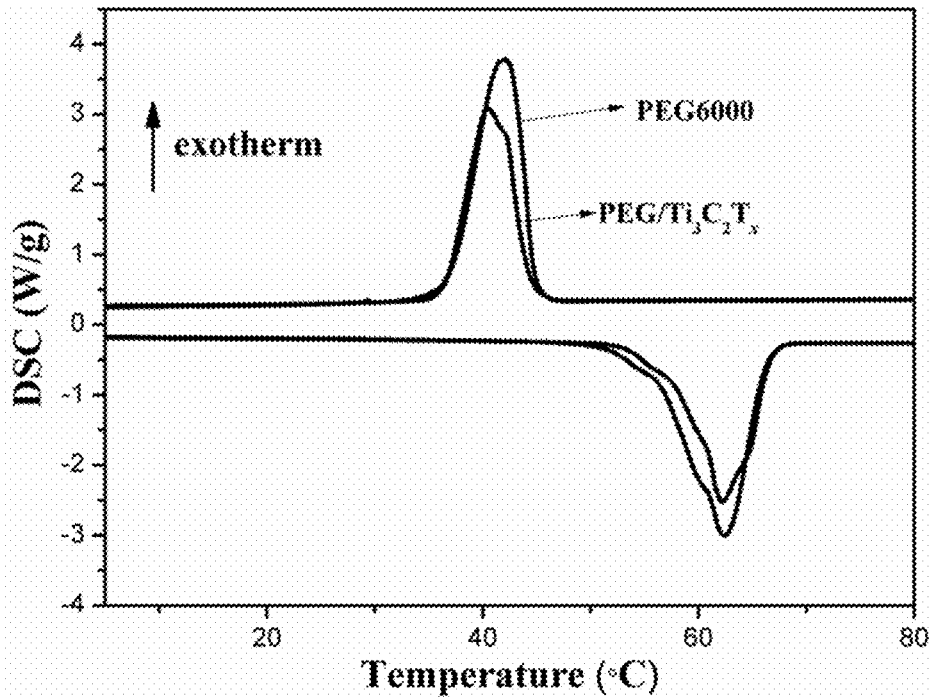
FIG. 4 is a dynamic stability control (DSC) curve of the PEG and the composite form-stable phase change energy storage material in Embodiment 1.
Figures 5, 6:
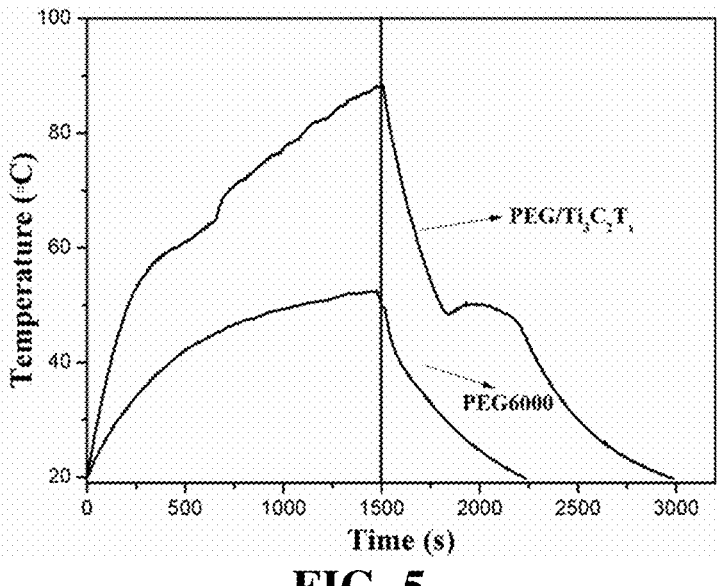
FIG. 5 is a photothermal conversion curve of the composite phase change energy storage composite in Embodiment 1 (the optical power density is 128.6 mW/cm$^2$).
FIG. 6 is digital photographs of the PEG and the composite phase change energy storage material in Embodiment 1 heated at 30° C., 65° C. and 95° C. for 20 min.
Figure 7:
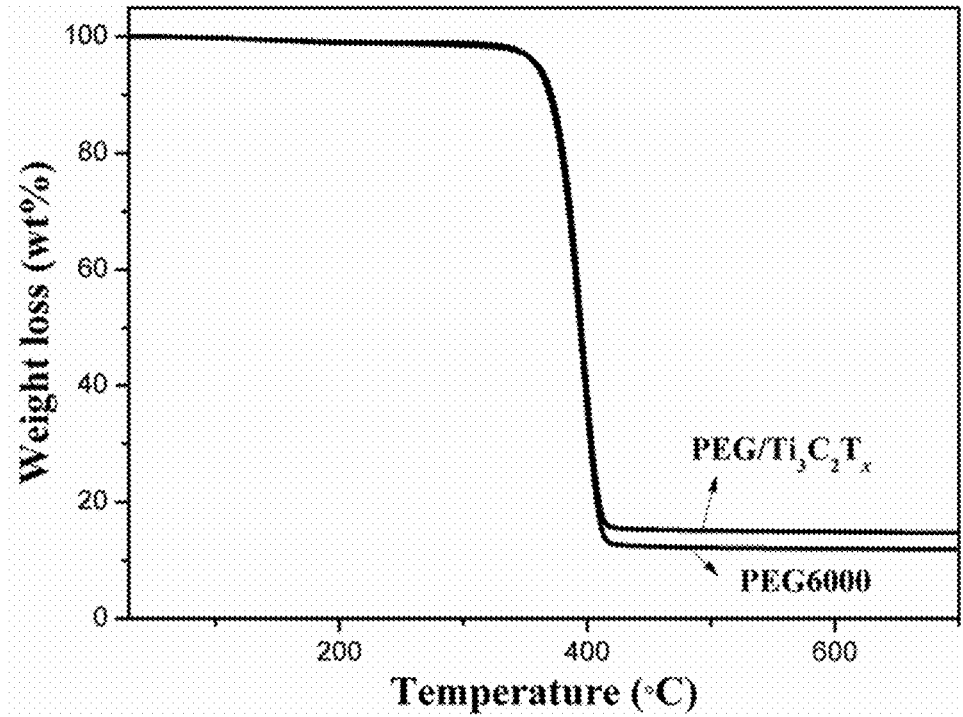
FIG. 7 is a thermogravimetry (TG) curve of the PEG and the composite form-stable phase change energy storage material in Embodiment 1.

It can be seen from the SEM and TEM images (as shown in FIGS. 1A and 1B) of the material, the diameter of the Ti$_3$C$_2$ nanosheet is about 0.5 to 2.2 μm, the layer thickness is single layer or several layers. After compositing with PEG, the composite is a layered stacked structure (as shown in FIGS. 2A and 2B). It can be seen from the XRD image (as shown in FIG. 3) of the material, the obtained nanosheet composite phase change energy storage material has similar crystallization characteristic with PEG, but the diffraction peak height of the phase change composite material is lower than that of PEG, that because the crystallization of PEG is restricted and disturbed by the supporting material. It can be seen from the DSC curve (as shown in FIG. 4) that the phase change enthalpy and phase change temperature of the $Ti_3C_2$/PEG shape-stabilized form-stable phase change energy storage composite material are obviously lower than those of PEG. The main reason is that the crystallization of PEG in $Ti_3C_2$/PEG is restricted and interfered by the $Ti_3C_2$ nanosheets which act as skeleton support. In the DSC, the phase change enthalpy of the $Ti_3C_2$/PEG phase change composite material reaches about 167 J/g, indicating that the obtained composite phase change energy storage material has good performance of phase change heat storage. Under the light, the temperature of the $Ti_3C_2$/PEG composite form-stable phase change energy storage material rises rapidly, the temperature evolution curve shows a temperature change inflection point at a range of 59° C. to 63° C., indicating that the material occurs phase change here, light energy is converted into thermal energy and stored in the form of latent heat. After stopping the light, the temperature of the nanosheet composite phase change energy storage material goes down rapidly; when the temperature falls to about 49° C. and no longer falls, and slightly rises, and maintains at about 49° C. for a period of time, the latent heat is released, which indicates that the material has the characteristics of photothermal conversion and phase change thermal storage. It can be seen from the form-stable effect diagram of the material at different temperatures (as shown in FIG. 6), the material remains solid at 95° C., while PEG has partially melted at 65° C., indicating that the obtained $Ti_3C_2$ nanosheet composite phase change energy storage material has excellent form-stable phase change characteristic. It can be seen from the TG curve of the material (as shown in FIG. 7) that the decomposition of the material occurs at 350° C., which is much higher than the phase change temperature, indicating that the obtained material has high thermal stability.

Embodiment 2

The mass ratio of PEG 6000 to the $Ti_3C_2$ nanosheet was changed to 7:3, the $Ti_3C_2$ nanosheet form-stable phase change composite material was obtained by compositing, and the other conditions were the same as those of Embodiment 1. The phase change enthalpy of the obtained form-stable phase change composite material can still reach about 154 J/g, having the same high thermal stability as Embodiment 1.

Embodiment 3

The mass ratio of PEG 6000 to the $Ti_3C_2$ nanosheet was changed to 9:1, the $Ti_3C_2$ nanosheet form-stable phase change composite material was obtained by compositing, and the other conditions were the same as those of Embodiment 1. The phase change enthalpy value of the obtained form-stable phase change composite material can still reach about 177 J/g, having the same high thermal stability as Embodiment 1.

Embodiments 4 to 12

The precursor in Embodiment 1 was substituted with $Ti_2AlC$, $Ti_3AlCN$, $V_2AlC$, $Nb_2AlC$, $TiNbAlC$, $Nb_4AlC_3$, $Ta_4AlC_3$, $(Ti_{0.5}Nb_{0.5})_2AlC$, or $(V_{0.5}Cr_{0.5})_3AlC_2$, and the other conditions were the same as those of Embodiment 1. The obtained materials can realize photothermal conversion and thermal energy storage, and still have excellent shape stability, energy storage density and thermal stability.

Embodiments 13 to 21

The precursor in Embodiment 2 was substituted with $Ti_2AlC$, $Ti_3AlCN$, $V_2AlC$, $Nb_2AlC$, $TiNbAlC$, $Nb_4AlC_3$, $Ta_4AlC_3$, $(Ti_{0.5}Nb_{0.5})_2AlC$, or $(V_{0.5}Cr_{0.5})_3AlC_2$, and the other conditions were the same as those of Embodiment 2. The obtained materials can realize photothermal conversion and thermal energy storage, and still have excellent shape stability, energy storage density and thermal stability.

Embodiments 22 to 30

The precursor in Embodiment 3 was substituted with $Ti_2AlC$, $Ti_3AlCN$, $V_2AlC$, $Nb_2AlC$, $TiNbAlC$, $Nb_4AlC_3$, $Ta_4AlC_3$, $(Ti_{0.5}Nb_{0.5})_2AlC$, or $(V_{0.5}Cr_{0.5})_3AlC_2$, and the other conditions were the same as those of Embodiment 3. The obtained materials can realize photothermal conversion and thermal energy storage, and still have excellent shape stability, energy storage density and thermal stability.

Embodiments 31 to 45

The organic solid-liquid phase change materials in Embodiments 1 to 3 were substituted with dodecanoic acid, myristic acid, pentadecanoic acid, palmitic acid and stearic acid, the solvent of deionized water in step S3 was substituted with ethanol in which the $Ti_3C_2$ nanosheets were dispersed, and the other conditions were the same as those of Embodiments 1 to 3 to prepare the $Ti_3C_2$ nanosheet form-stable phase change composite material. The obtained materials can realize photothermal conversion and thermal energy storage, and still have excellent shape stability, energy storage density and thermal stability.

Embodiments 46 to 57

The organic solid-liquid phase change materials in Embodiments 1 to 3 were substituted with lauryl alcohol, tetradecyl alcohol, hexadecanol, and octadecanol, the solvent of deionized water in step S3 was substituted with ethanol in which the $Ti_3C_2$ nanosheets were dispersed, and the other conditions were the same as those of Embodiments 1 to 3 to prepare the $Ti_3C_2$ nanosheet form-stable phase change composite material. The obtained materials can realize photothermal conversion and thermal energy storage, and still have excellent shape stability, energy storage density and thermal stability.

The invention claimed is:
1. A photothermal energy conversion and thermal energy storage form-stable phase change composite material, comprising a supporting material and an organic phase change material,
   wherein:
   a mass ratio of the supporting material and the organic phase change material is 3:7 to 1:9;
   the organic phase change material is disposed between adjacent layers of the supporting material to form a layered stacked structure;
   each layer of the supporting material is a nanosheet of $Ti_2C$, $Ti_3CN$, $V_2C$, $TiNbC$, $Nb_4C_3$, $(Ti_{0.5}Nb_{0.5})_2C$, or

$(V_{0.5}Cr_{0.5})_3C_2$, and the nanosheet is single layer or multilayer having a size of a cross section of 1.5 to 2.2 μm; and the organic phase change material is paraffin, fatty acid, ester of fatty acid, or alcohol compound, and the alcohol compound is selected from lauryl alcohol, tetradecyl alcohol, hexadecanol, octadecanol, polyethylene glycol, and mixtures thereof.

2. The material according to claim 1, wherein the paraffin has a melting point of 20 to 60° C.

3. The material according to claim 1, wherein the fatty acid is dodecanoic acid, myristic acid, pentadecanoic acid, palmitic acid, or stearic acid.

4. The material according to claim 1, wherein the alcohol compound has a molecular weight of 2000 to 20000.

5. A method for preparing the photothermal energy conversion and thermal energy storage form-stable phase change composite material in claim 1, comprising the following steps:

S1. mixing a precursor with 40 vol. % hydrofluoric acid at a ratio of 1 g:8 mL to 1 g:10 mL and placing for 1 to 3 days, to obtain stacked Mxenes, wherein the precursor is $Ti_2AlC$, $Ti_3AlCN$, $V_2AlC$, $TiNbAlC$, $Nb_4AlC_3$, $(Ti_{0.5}Nb_{0.5})_2AlC$, or $(V_{0.5}Cr_{0.5})_3AlC_2$;

S2. centrifugally washing the obtained stacked MXenes with deionized water to pH 7 and drying, mixing MXenes with dimethyl sulfoxide at a ratio of 1 g:10 mL to 1 g:14 mL, magnetic stirring the solution at room temperature for 18 hours, and obtaining a precipitate by centrifugal separation, S3. mixing the precipitate obtained in step S2 with deionized water at a ratio of 1 g:200 mL to 1 g:300 mL, ultrasonic stripping the solution for 5 hours, obtaining the MXenes nanosheets after solid-liquid separation and ultrasonic cleaning, and dissolving the MXenes nanosheets in a solvent to obtain a MXenes nanosheet dispersion liquid with a mass fraction of 1% to 5%; and S4. adding an organic phase change material to the MXenes nanosheet dispersion liquid, wherein the mass ratio of the organic phase change material to the MXenes nanosheet is 9:1 to 7:3, obtaining the photothermal energy conversion and thermal energy storage form-stable phase change composite after ultrasonic mixing and drying, wherein the organic phase change material is paraffin, fatty acid, ester of fatty acid or alcohol compound.

6. The method according to claim 5, wherein step S3 further comprises: after ultrasonic stripping, obtaining precipitates of MXenes nanosheets by solid-liquid separation; ultrasonically cleaning the precipitates with deionized water for 3 times, removing supernatant by solid-liquid separation, and then dispersing the precipitates of MXenes nanosheets in water or ethanol to obtain MXenes nanosheet dispersion liquid, wherein the solid-liquid separation is centrifugal separation.

7. The method according to claim 5, wherein in step S4, after ultrasonic mixing, adjusting pH of the solution to 8, and drying in vacuum at 50° C.

8. The method according to claim 5, wherein the paraffin has a melting point of 20 to 60° C.; the fatty acid is dodecanoic acid, myristic acid, pentadecanoic acid, palmitic acid, or stearic acid; and the alcohol compound is lauryl alcohol, tetradecyl alcohol, hexadecanol, octadecanol, or polyethylene glycol having a molecular weight of 2000 to 20000.

9. The material according to claim 1, wherein each layer of the supporting material is a nanosheet of $Ti_2C$.

10. The material according to claim 1, wherein each layer of the supporting material is a nanosheet of $Ti_3CN$.

11. The material according to claim 1, wherein each layer of the supporting material is a nanosheet of $V_2C$.

12. The material according to claim 1, wherein each layer of the supporting material is a nanosheet of TiNbC.

13. The material according to claim 1, wherein each layer of the supporting material is a nanosheet of $Nb_4C_3$.

14. The material according to claim 1, wherein each layer of the supporting material is a nanosheet of $(Ti_{0.5}Nb_{0.5})_2C$.

15. The material according to claim 1, wherein each layer of the supporting material is a nanosheet of $(V_{0.5}Cr_{0.5})_3C_2$.

* * * * *